United States Patent [19]

Malen

[11] 4,428,447
[45] Jan. 31, 1984

[54] VEHICLE FRONT END STRUCTURE

[75] Inventor: Donald E. Malen, Lathrup Village, Mich.

[73] Assignee: General Motors Corporation, Detroit, Mich.

[21] Appl. No.: 368,901

[22] Filed: Apr. 15, 1982

[51] Int. Cl.³ .............................................. B62D 25/08
[52] U.S. Cl. .................................... 180/68 R; 165/53; 180/69 C; 296/194
[58] Field of Search ................ 180/68 R, 68 P, 69 C, 180/54 A, 89.1; 296/194; 165/53, 47, 44

[56] References Cited

U.S. PATENT DOCUMENTS

| | | | |
|---|---|---|---|
| 2,104,723 | 1/1938 | Best | 180/68.4 |
| 3,075,605 | 1/1963 | Nemeth | 180/89 |
| 4,186,476 | 2/1980 | Mair et al. | 180/69.21 |

*Primary Examiner*—David M. Mitchell
*Attorney, Agent, or Firm*—Herbert Furman

[57] ABSTRACT

A vehicle front end structure includes a radiator support having a generally rectangular shaped opening and an inverted V-shaped brace having the legs and the apical portion secured to the radiator support for reinforcement purposes. The apical portion also provides a striker for the vehicle hood latch.

2 Claims, 6 Drawing Figures

VEHICLE FRONT END STRUCTURE

This invention relates generally to vehicle front end structures and more particularly to a vehicle front end structure which includes a brace reinforcing the radiator support and also providing a striker for the hood latch.

Vehicle front end structures traditionally include a radiator support having a central rectangular or similar shaped opening providing for air flow through the radiator support to the radiator. Head light supports are provided to each side of the radiator support. A vertically linear brace may also be provided across the opening of the radiator support.

This invention provides a vehicle front end structure having a generally inverted V-shaped brace which reinforces the radiator support and also provides a striker for the vehicle hood latch.

In the preferred embodiment, the V-shaped brace is comprised of a pair of members, each providing a leg of the brace. The members are secured together at one end thereof to provide the apical portion of the brace. The free end of each leg of the brace is secured to a respective lower corner of the radiator support adjacent the opening therethrough and the apical portion of the brace is secured to the upper cross member of the radiator support. One of the members has an opening therethrough adjacent its secured end, with the material of the opening being lanced and located to provide a guide for a vehicle hood latch member. The other member has a rib or strut adjacent its secured end to provide a striker for the hood latch member.

The primary feature of this invention is that it provides an improved vehicle front end structure having a generally inverted V-shaped brace secured thereto for reinforcing the radiator support and for also providing a striker for a vehicle hood latch.

This and other features of the invention will be readily apparent from the following specification and drawings wherein.

Figure 1:
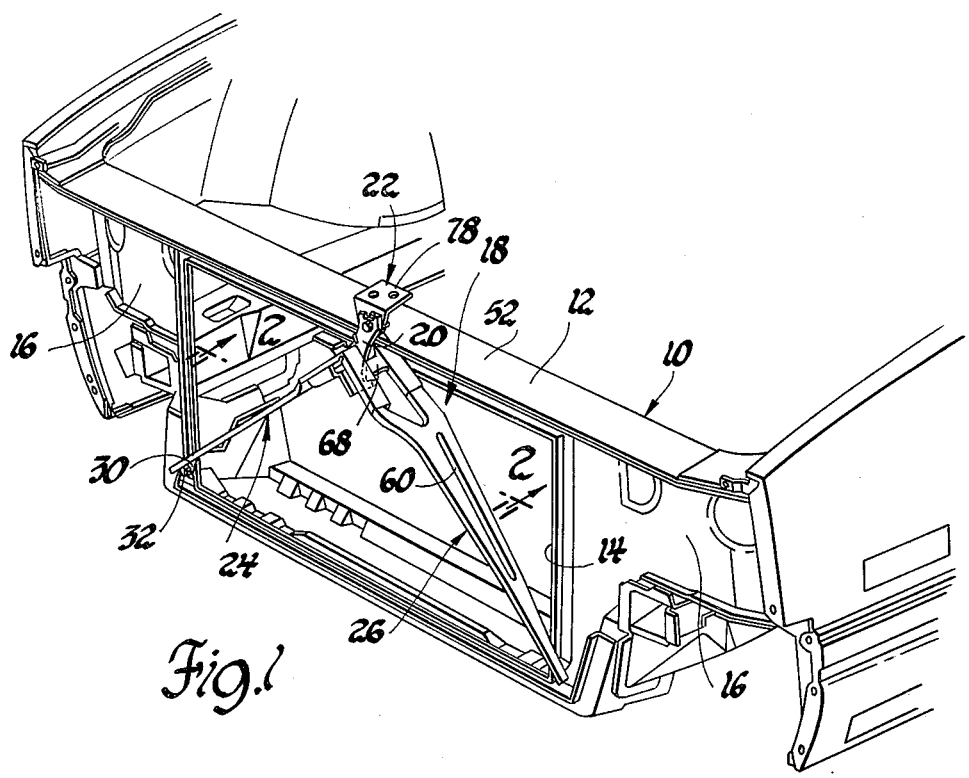
FIG. 1 is a partial perspective view of a vehicle front end structure embodying a brace according to this invention.

Referring now particularly to FIG. 1 of the drawings, a vehicle front end structure designated generally 10 includes a radiator support 12 which provides a generally rectangularly shaped opening 14 to the radiator, not shown, which is mounted to the support 12 inwardly of the opening 14. The front end structure further includes a head light support 16 to each side of the radiator support 12. Such a vehicle front end structure is in current production use on vehicles manufactured by the assignee of this invention and forms no part of this invention.

Figure 6:
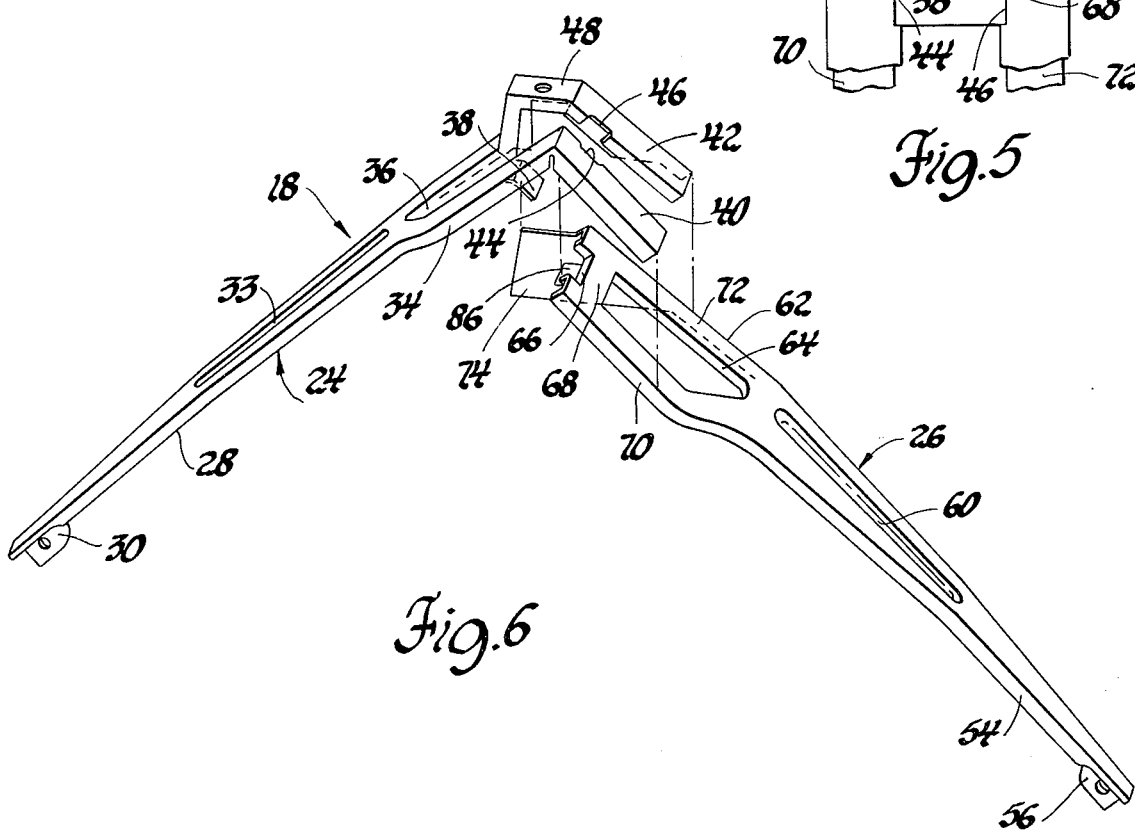
FIG. 6 is an exploded perspective view.

An inverted generally V-shaped brace 18 according to this invention is positioned in front of the opening 14. The brace reinforces the radiator support 12 and also provides a striker for the safety catch 20 of a vehicle hood latch 22. As best seen in FIG. 6, brace 18 is comprised of a pair of stamped sheet metal members 24 and 26, each providing a leg of the brace. The member 24 has a lower tapered portion 28 which is flanged on the front and rear sides thereof. The rear flange includes an integral apertured ear 30 which receives a bolt 32, FIG. 2, to secure the member 24 to the lower left-hand corner portion of the radiator support 12. Portion 28 includes a stamped elongated reinforcement rib or depression 33. The upper portion 34 of the member 24 is widened and provided with an inwardly stamped depression 36. A portion of the base of this depression is lanced and bent inwardly at 38 to provide a guide for the safety catch 20 as will be further described. The remainder of the base of depression 36 is removed to provide front and rear flanged portions 40 and 42 of respective V and U shape. The rear flange of portion 40 is notched at 44 and the front flange of portion 42 is notched at 46. The base 48 of portion 42 is apertured and bolted at 50 to the upper cross member 52 of support 12.

Figure 2:
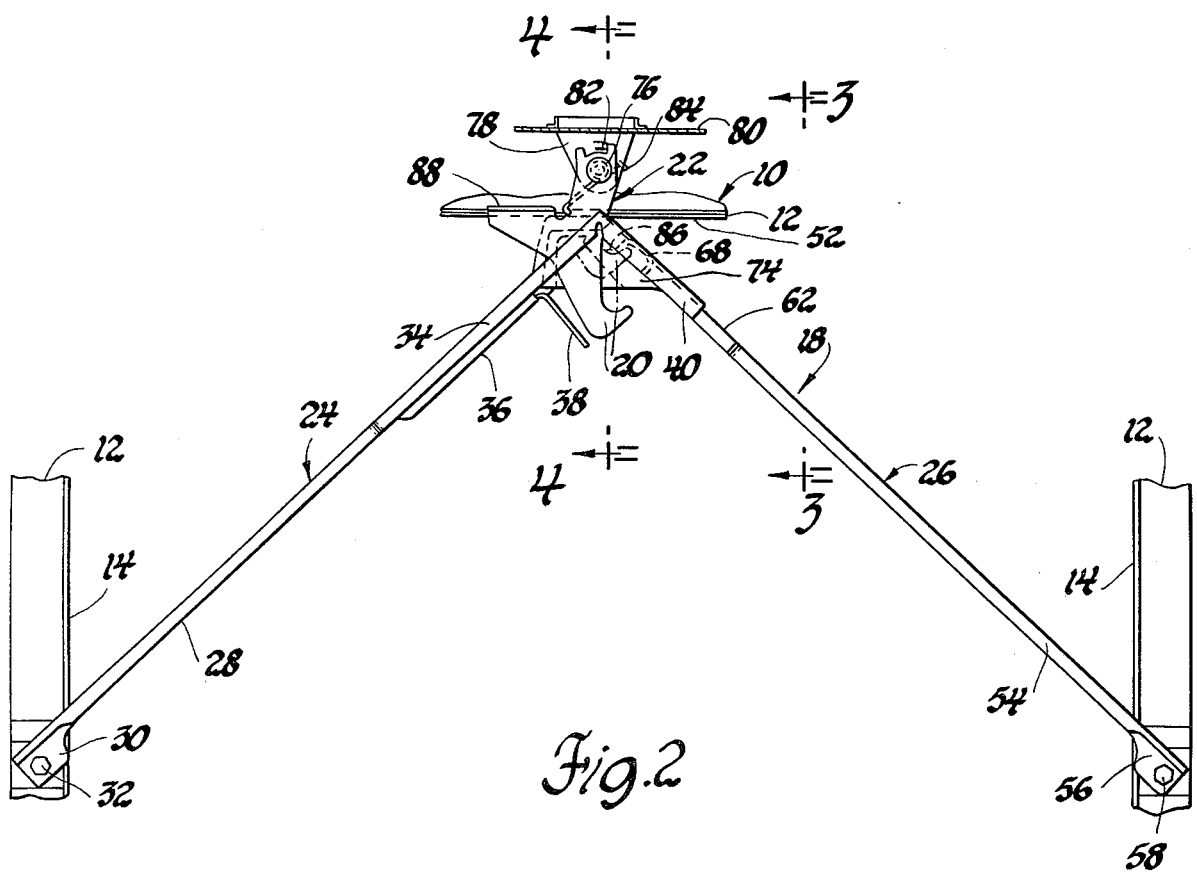
FIG. 2 is an enlarged view taken generally along line 2—2 of FIG. 1.

The lower tapered portion 54 of the member 26 is also flanged on the front and rear sides thereof. The rear flange includes an apertured ear 56 which receives a bolt 58 to secure the member 26 to the lower right hand corner portion of the radiator support 12, as shown in FIG. 2. The lower portion 54 is provided with a stamped elongated reinforcement rib or depression 60. The upper portion 62 of member 26 is widened and provided with an inwardly flanged closed opening 64 and an inwardly flanged U-shaped opening 66 which define a cross rib 68.

Figure 3:
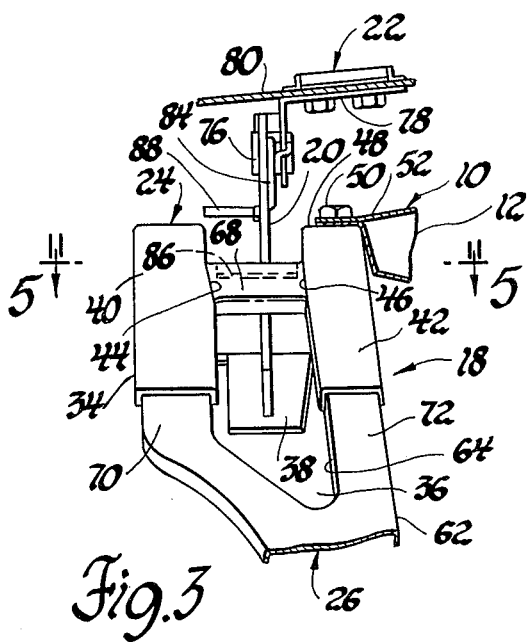
FIG. 3 is an enlarged view taken generally along the plane indicated by line 3—3 of FIG. 2.
Figure 4:
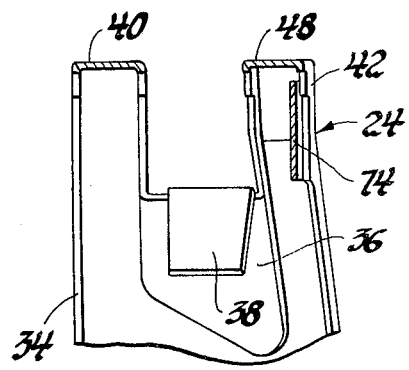
FIG. 4 is an enlarged view taken generally along the plane indicated by line 4—4 of FIG. 2.
Figure 5:
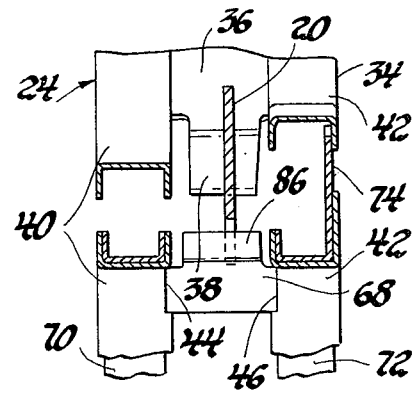
FIG. 5 is a sectional view taken along the plane indicated by line 5—5 of FIG. 3.

When the upper portions 34 and 62 of members 24 and 26 are fitted together, cross rib 68 is received in notches 44 and 46 and the front and rear flanged portions 70 and 72 of portion 62 are respectively received within the terminal legs of V-shaped front portion 40 and U-shaped rear portion 42, FIGS. 1 and 3, and spot welded thereto at a number of places. The rear flange of portion 72 includes an integral extension 74 which is overlapped by the rear flanges of the legs and base 48 of portion 42 and spot welded thereto, FIG. 3.

After interfitting and welding, the members 24 and 26 provide the V-shaped brace 18 which is then bolted at 32, 50 and 58 to the radiator support 12.

The safety catch 20 is pivoted at 76 to a bracket 78 which is secured to a partially indicated vehicle hood 80. Engageable tabs 82 on the catch 20 and bracket 78, FIG. 2, normally locate the catch in operative position as shown under the action of a torsion spring 84.

In this position, the hood portion of the safety catch 20 is located in lower spaced relationship to the cross rib 68 and will engage the uppermost wall of the rib and an extension 86 of this wall as indicated in dash lines in FIG. 2 should the hood latch be released. Extension 86 is formed from the lanced base of opening 66. The safety catch 20 includes a manually engageable tab or flange 88 so that the catch can be manually rotated clockwise about the pivot 76 to permit the hood to be opened as the hook portion of the catch moves along guide 38 and out of the path of the rib 68 and extension 86.

When the hood is closed, the engagement of the hook portion of the catch with the extension 86 rotates the catch 20 slightly clockwise so that the hook portion of the catch can move past the extension 86 to its operative position.

Thus this invention provides a brace for reinforcing the radiator support and also providing a striker for the hood latch.

The embodiments of the invention in which an exclusive property or privilege is claimed are defined as follows:

1. A vehicle front end structure comprising, in combination, a radiator support including a rectangularly shaped portion defining a generally rectangularly shaped air access opening, an inverted generally V-shaped brace including a pair of divergent legs and an apical portion located across said opening, each leg of said brace being secured to a respective lower corner of said rectangularly shaped portion and the apical portion of the brace being secured to the upper side of said rectangularly shaped portion, means on the apical portion of the brace providing an opening therethrough and a striker portion for a hood latch member adjacent the opening, said brace being formed of a pair of sheet metal members, each providing one of the legs thereof, with the opening being provided by one of the members and the striker portion by the other of the members.

2. A vehicle front end structure comprising, in combination, a radiator support structure including a rectangularly shaped portion defining a generally rectangularly shaped air access opening, an inverted generally V-shaped brace including a pair of divergent legs and an apical portion located across said opening, said leg of said brace being secured to a respective lower corner of said rectangularly shaped portion and the apical portion of the brace being secured to the upper side of said rectangularly shaped portion, the apical portion of the brace including an opening therethrough and a striker portion for a hood latch member traversing the opening, said brace being formed of a pair of sheet metal members, each providing one of the legs thereof, with the opening being provided by spaced portions of one of the members and the striker portion being provided by a rib of the other of the members traversing the spaced portions.

* * * * *